United States Patent
Takamori et al.

(10) Patent No.: US 12,012,696 B2
(45) Date of Patent: Jun. 18, 2024

(54) PAPERMAKING DEVICE AND METHOD FOR PRODUCING PAPERMAKING DEVICE

(71) Applicant: ICHIKAWA CO., LTD., Tokyo (JP)

(72) Inventors: Yuya Takamori, Tokyo (JP); Manami Morinaga, Tokyo (JP)

(73) Assignee: ICHIKAWA CO., LTD., Tokyo (JP)

( * ) Notice: Subject to any disclaimer, the term of this patent is extended or adjusted under 35 U.S.C. 154(b) by 0 days.

(21) Appl. No.: 17/815,446

(22) Filed: Jul. 27, 2022

(65) Prior Publication Data
US 2023/0051332 A1 Feb. 16, 2023

(30) Foreign Application Priority Data

Jul. 30, 2021 (JP) ................. 2021-126321

(51) Int. Cl.
*D21F 3/02* (2006.01)
*C08G 18/10* (2006.01)
(Continued)

(52) U.S. Cl.
CPC ........... *D21F 3/0236* (2013.01); *C08G 18/10* (2013.01); *C08G 18/3221* (2013.01); *D21F 7/083* (2013.01)

(58) Field of Classification Search
CPC ...... D21F 3/0236; D21F 7/083; D21F 3/0227; C08G 18/10; C08G 18/3221; C08G 18/12;
(Continued)

(56) References Cited

U.S. PATENT DOCUMENTS

| 4,808,691 A | 2/1989 | König et al. |
| 2009/0018256 A1 | 1/2009 | Nefzger et al. |
| 2018/0094385 A1* | 4/2018 | Hikida ............... D21F 7/08 |

FOREIGN PATENT DOCUMENTS

| EP | 3 282 052 A1 | 2/2018 |
| JP | 3201639 U | 12/2015 |

(Continued)

OTHER PUBLICATIONS

Extended European Search Report dated Dec. 22, 2022, in corresponding European Patent Application No. 22187536.2, 6 pages.
(Continued)

*Primary Examiner* — Eric Hug
*Assistant Examiner* — Matthew M Eslami
(74) *Attorney, Agent, or Firm* — Oblon, McClelland, Maier & Neustadt, L.L.P.

(57) ABSTRACT

Provided are a papermaking device having an excellent strength in which the unevenness in strength between its parts is suppressed, and a method for producing the papermaking device.

Also provided is a papermaking device for use in papermaking machine, the papermaking device comprising at least one resin layer comprising a polyurethane resin, wherein the polyurethane resin comprises as a component a polyether polycarbonate diol comprising one or more unit(s) A expressed by the following formula (1).

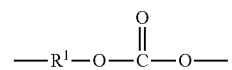

(1)

18 Claims, 5 Drawing Sheets

(51) Int. Cl.
*C08G 18/32* (2006.01)
*D21F 7/08* (2006.01)

(58) Field of Classification Search
CPC . C08G 18/44; C08G 18/7671; C08G 18/7621
See application file for complete search history.

(56) References Cited

FOREIGN PATENT DOCUMENTS

| JP | 2016-199813 A | 12/2016 |
| JP | 2020-125428 A | 8/2020 |
| JP | 2020-128461 A | 8/2020 |
| JP | 2020-526681 A | 8/2020 |
| WO | WO 2014/086650 A1 | 6/2014 |
| WO | WO 2019/121218 A1 | 6/2019 |
| WO | WO 2022/223163 A1 | 10/2022 |

OTHER PUBLICATIONS

European Third Party Observation issued Dec. 7, 2023 in European Patent Application No. 22187536.2 (with unedited computer-generated English Translation), 10 pages.
"PEPCD polyether-PolyCarbonate Diol," CAS No. 92538-66-4, Mitsubishi Chemical, Jun. 2020, 8 pages.
Szycher, "Szycher's Handbook of Polyurethanes", CRC Press, $2^{nd}$ Edition, Jul. 13, 2012, 4 pages.

\* cited by examiner

PAPERMAKING DEVICE AND METHOD FOR PRODUCING PAPERMAKING DEVICE

CROSS REFERENCE TO RELATED APPLICATIONS

This application is based upon and claims benefit of priority from Japanese Patent Application No. 2021-126321, filed on Jul. 30, 2021, the entire contents of which are incorporated herein by reference.

BACKGROUND

Technical Field

The present invention relates to a papermaking device and a method for producing a papermaking device.

Background Art

A papermaking machine that removes water from a raw paper material is generally provided with a wire part, a press part and a dryer part. These wire part, press part and dryer part are arranged in this order along the wet paper web transfer direction.

The wet paper web is transferred from the wire part to the press part and then to the dryer part, by being passed successively from one papermaking device to another equipped in each of these parts while being dehydrated, and finally dried in the dryer part.

The papermaking devices used in these parts correspond to each function of these part such as dehydrating (wire part), squeezing (press part), and drying (dryer part).

For instance, in each part of such a papermaking machine, various papermaking belts and papermaking rolls are used as papermaking devices for purposes such as transferring wet paper web or compressing wet paper web, etc. Such papermaking belts include, for example, a wet paper web transfer belt for transferring and delivering wet paper web (a transfer belt), a shoe press belt used in a shoe press mechanism, etc., whereas papermaking rolls include, for example, a press roll used in a roll press mechanism, etc.

Specifically, a press part generally is provided with one or more press device(s) which is/are positioned in series along the wet paper web transfer direction. In each press device, either an endless felt is placed, or ended felts are connected on the papermaking machine to form an endless felt which is placed in the press device. And, each press device has a roll press mechanism consisting of a pair of rolls opposing to each other, or a shoe press mechanism having an endless shoe press belt placed between a concave-shaped shoe opposing to a roll.

A felt carrying a wet paper web moves along the wet paper web transfer direction, passing through either the roll press mechanism or the shoe press mechanism, where the water is squeezed out of the wet paper web by pressing the felt carrying the wet paper web such that the felt continuously absorbs water or the water passes through the felt to be drained to the outside.

In a shoe press belt, in general, a reinforcing substrate is embedded in a resin, and this resin constitutes an outer circumferential layer which is in contact with a felt and an inner circumferential layer which is in contact with a shoe. The shoe press belt repeatedly runs between the roll and the shoe being pressurized. On the surface of the press roll a resin layer is disposed, and this resin layer repeatedly presses the wet paper web in the roll press mechanism in cooperation with the felt and the opposing press roll. Because a papermaking machine is generally run at a high speed, these papermaking device needs a good durability including abrasion resistance and flex resistance.

JP 2016-199813 A proposes, in a shoe press belt having drain grooves, for a purpose of preventing the collapse or loss of a land that constitutes the drain grooves and further preventing or reducing the occurrence of cracks, a shoe press belt comprising a reinforcing substrate embedded in polyurethane wherein the polyurethane and the reinforcing substrate are integrated, wherein at least the polyurethane constituting the outer circumferential surface of the shoe press belt is a thermosetting polyurethane obtained by curing a urethane prepolymer with a curing agent, and the urethane prepolymer comprises a first urethane prepolymer obtained by a reaction of a polyol component comprising certain straight-chain aliphatic polycarbonate diol with an aromatic diisocyanate.

SUMMARY

Technical Problem

A shoe press belt that is provided with a polyurethane layer comprising a polycarbonate diol as a component of a urethane prepolymer has an excellent strength. On the other hand, the present inventors found that, when a polycarbonate diol is used as a component of a urethane prepolymer, there is unevenness in strength among parts of the obtained shoe press belt. The presence of uneven strength among parts of the shoe press belt may cause the shoe press belt to be damaged or degraded starting from a part where the strength is low, and, as a result, it will be difficult to increase the durability of the shoe press belt. This also applies to other papermaking devices having resin layers such as a wet paper web transfer belt and a press roll.

Accordingly, an object of the present invention is to provide a papermaking device having an excellent strength in which the unevenness in strength between its parts is suppressed, and a method for producing the papermaking device.

Solution to Problem

The present inventors have made intensive studies in order to achieve the aforementioned object, and as a result found that it is possible to increase the strength of the resin layer that constitutes the shoe press belt while suppressing the unevenness in strength by combining a certain polyether polycarbonate diol in the resin layer of the papermaking device, and thus accomplished the present invention.

A gist of the present invention is as follows:

[1] A papermaking device for use in papermaking machine,
comprising at least one resin layer comprising a polyurethane resin, wherein:
the polyurethane resin comprises as a component a polyether polycarbonate diol comprising one or more unit(s) A expressed by the formula (1) below:

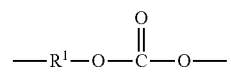

(1)

in the formula (1):
R$^1$ is a bivalent group derived from a polyether polyol having the number average molecular weight equal to or higher than 200 and equal to or less than 3,000.

[2] The papermaking device according to [1], wherein:
R$^1$ is a group expressed by the formula (2) below:

$$-\!\!\!+\!\!R^2-O\!\!+_{\!n}\!\!-\quad (2)$$

in the formula (2):
R$^2$ is, for each occurrence, independently identical or different, and is a straight-chain, branched or cyclic alkylene group having 1 or more and 20 or less carbon atom(s), and
n is an integer equal to or more than 2 and equal to or less than 42.

[3] The papermaking device according to [2], wherein R$^2$ is selected from the group consisting of an ethylene group, n-propylene group, n-butylene group, n-pentylene group and n-hexylene group.

[4] The papermaking device according to any one of [1] to [3], wherein the polyurethane resin is obtainable by reacting a urethane prepolymer having an isocyanate group comprising as (a) component(s) one or more of the polyether polycarbonate diol(s) with a curing agent having an active hydrogen group.

[5] The papermaking device according to [4], wherein the urethane prepolymer is obtainable by reacting (a) polyisocyanate compound(s) comprising one or more selected from the group consisting of p-phenylene-diisocyanate, 4,4'-methylenebis(phenylisocyanate), dimethylbiphenylene diisocyanate, 2,4-tolylene-diisocyanate, 2,6-tolylene-diisocyanate and 1,4-bis(isocyanatemethyl)cyclohexane with (a) polyol compound(s) comprising one or more of the polyether polycarbonate diol(s).

[6] The papermaking device according to [4] or [5], wherein the NCO content of the urethane prepolymer is equal to or higher than 3.0% and equal to or less than 15%.

[7] The papermaking device according to any one of [4] to [6], wherein the curing agent comprises one or more selected from the group consisting of 4,4'-methylene-bis-(2-chloroaniline), dimethylthiotoluene diamine, diethyltoluene diamine, 4,4'-methylene-bis-(3-chloro-2,6-diethylaniline), hydroquinonebis-β-hydroxyethyl ether and 1,4-butanediol.

[8] The papermaking device according to any one of Claims [4] to [7], wherein the curing agent comprises one or more of the polyether polycarbonate diol(s).

[9] The papermaking device according to any one of [1] to [3], wherein the polyurethane resin is obtainable by reacting a urethane prepolymer having an isocyanate group with a curing agent having an active hydrogen group comprising one or more of the polyether polycarbonate diol(s).

[10] The papermaking device according to any one of [1] to [9], wherein the hardness of the resin layer measured at 22° C. in conformity to JIS K 6301:1995 is equal to or higher than 90 HS JISA and equal to or less than 98 HS JISA.

[11] The papermaking device according to any one of [1] to [10], wherein the papermaking device is a shoe press belt.

[12] The papermaking device according to [11], comprising as the resin layer a first layer which constitutes the outer circumferential surface of the shoe press belt, wherein:
the first layer comprises the polyurethane resin.

[13] The papermaking device according to [11] or [12], comprising as the resin layer a second layer which constitutes the inner circumferential surface of the shoe press belt, wherein:
the second layer comprises the polyurethane resin.

[14] A method for producing a papermaking device for use in a papermaking machine,
comprising a step of forming a resin layer comprising a polyurethane resin by curing a polyurethane material, wherein:
the polyurethane material comprises as a component a polyether polycarbonate diol comprising one or more unit(s) A expressed by the formula (1) below:

$$-\!\!\!-\!\!R^1\!\!-\!\!O\!\!-\!\!\overset{\overset{\displaystyle O}{\|}}{C}\!\!-\!\!O\!\!-\!\!\!-\quad (1)$$

in the formula (1):
R$^1$ is a bivalent group derived from a polyether polyol having the number average molecular weight equal to or higher than 200 and equal to or less than 3,000.

Advantageous Effects of Invention

The above-mentioned configuration allows for providing a papermaking device having an excellent strength in which the unevenness in strength between its parts is suppressed, and a method for producing the papermaking device.

DESCRIPTION OF THE EMBODIMENTS

Hereinafter, referring to the appended drawings, preferred embodiments of a papermaking device and a method for producing a papermaking device according to the present invention will be described in detail. In the following description, a shoe press belt will be described as an example of a papermaking device, though it is needless to say that the papermaking device according to the present invention is not limited to the shoe press belt.

<1. Shoe Press Belt>

First, a shoe press belt as an example of a papermaking device according to a preferred embodiment of the present invention will be explained.

Figure 1:
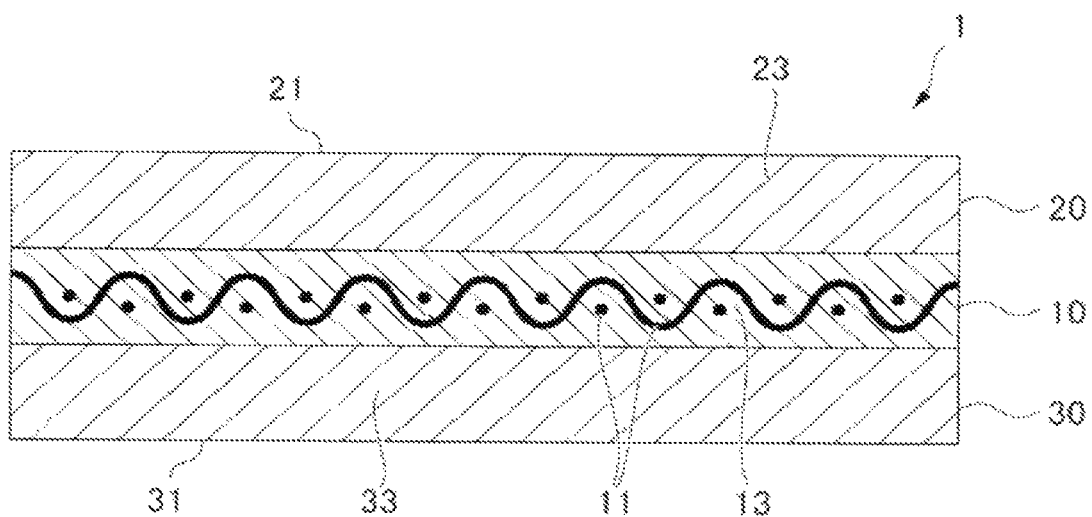
FIG. 1 is a cross-sectional view in a cross machine direction showing a papermaking device according to one embodiment of the present invention.

FIG. 1 is a cross-sectional view in a cross machine direction showing an example of a papermaking device (a shoe press belt) according to a preferred embodiment of the present invention. Note that, in the drawing, each member has been emphasized in size as appropriate for ease of illustration and thus does not indicate the actual proportion and size of each member. Herein, the aforementioned cross machine direction may be referred to as "CMD", and the machine direction may be referred to as "MD".

The shoe press belt 1 shown in FIG. 1 is used, in the press part, more specifically in a shoe press mechanism, of a papermaking machine, to transfer a wet paper web in cooperation with a felt and to squeeze water from the wet paper web. The shoe press belt 1 forms an endless band-shaped body. That is, the shoe press belt 1 is an annular belt. In addition, a circumferential direction of the shoe press belt 1 is generally disposed along a machine direction (MD) of the papermaking machine.

The shoe press belt 1 shown in FIG. 1 has a reinforcing fibrous substrate layer 10, a first resin layer 20 provided on one principal surface on the outer surface side of the reinforcing fibrous substrate layer 10, and a second resin layer 30 provided on the other principal surface on the inner surface of the reinforcing fibrous substrate layer 10, and these layers are laminated to form the shoe press belt 1.

The reinforcing fibrous substrate layer 10 is composed of a reinforcing fibrous substrate 11 and a resin 13. The resin 13 is present in the reinforcing fibrous substrate layer 10 such that it fills the spaces between fibers in the reinforcing fibrous substrate 11. That is, a part of the resin 13 is impregnated into the reinforcing fibrous substrate 11, whereas the reinforcing fibrous substrate 11 is embedded in the resin 13.

The reinforcing fibrous substrate 11 is not particularly limited, and, for example, a woven fabric consisting of warp yarns and weft yarns woven by a weaving machine, etc. may generally be used. An unwoven grid-like web material in which warp rows and weft rows are superimposed on each other can also be used. Alternatively, the woven fabric, grid-like material, etc. are used in combination of two or more.

The fineness of the fibers constituting the reinforcing fibrous substrate 11 is not particularly limited, and can be, for example, equal to or higher than 300 and equal to or less than 10,000 dtex, preferably, equal to or higher than 500 and equal to or less than 6,000 dtex.

The fineness of the fibers constituting the reinforcing fibrous substrate 11 can be different at each part where the fiber is used. For instance, the warp yarns and weft yarns of the reinforcing fibrous substrate 11 may have different fineness.

As ingredients of a reinforcing fibrous substrate 11, polyester (polyethylene terephthalate, polybutylene terephthalate, etc.), aliphatic polyamide (polyamide 6, polyamide 11, polyamide 12, polyamide 612, etc.), aromatic polyamide (aramid), polyvinylidene fluoride, polypropylene, polyether ether ketone, polytetrafluoroethylene, polyethylene, wool, cotton, metal, etc., may be used either alone or in combination of two or more.

The resin 13 will be described later.

The first resin layer 20 is a resin layer provided on one principal surface on the outer surface side of the reinforcing fibrous substrate layer 10, and is composed of the resin 23. The first resin layer 20 constitutes an outer circumferential surface 21, and, when the shoe press belt 1 is being used, the wet paper web is carried and transferred via the felt on the outer circumferential surface 21.

The second resin layer 30 is a resin layer provided on the other principal surface on the inner surface side of the reinforcing fibrous substrate layer 10, and is composed of the resin 33. The second resin layer 30 constitutes the inner circumferential surface 31, and, when the shoe press belt 1 is being used, the inner circumferential surface 31 is disposed such that it comes into contact with the shoe of the shoe press mechanism (not illustrated).

Here, the resin 13 in the reinforcing fibrous substrate layer 10, the resin 23 which constitutes the first resin layer 20 and the resin 33 which constitutes the second resin layer of the shoe press belt 1 will be explained.

In addition, in the present embodiment, at least one resin layer of the reinforcing fibrous substrate layer 10, the first resin layer 20 and the second resin layer 30 of the shoe press belt 1 comprises a polyurethane resin. The polyurethane resin comprises as a component polyether polycarbonate diol X comprising one or more unit(s) A expressed by the formula (1) below:

in the formula (1):
R$^1$ is a bivalent group derived from a polyether polyol having the number average molecular weight equal to or higher than 200 and equal to or less than 3,000.

Because the resin 13, resin 23 and resin 33 can have similar configurations, the resin 23 of the first resin layer 20 will be described in detail as a representative hereinbelow. Moreover, in the description below, cases in which the resin 23 comprises a polyurethane resin which comprises as a component the polyether polycarbonate diol X described above will principally be described.

The polyurethane resin that constitutes the resin 23 comprises the polyether polycarbonate diol X described above as a component. This suppresses the unevenness in strength in the first resin layer 20 composed of the resin 23 and at the same time improves the strength of the first resin layer 20, and, as a result, suppresses the unevenness in strength among parts of the shoe press belt 1 and at the same time improves the strength of the shoe press belt 1.

For a detailed explanation, a polyurethane layer comprising a polycarbonate diol as a component of a urethane prepolymer has an excellent strength. On the other hand, the present inventors found that, when a polycarbonate diol is used as a component of a urethane prepolymer, there would be unevenness in strength among parts of the resulting shoe press belt. The presence of unevenness in strength among parts of the shoe press belt may cause the shoe press belt to be damaged or degraded starting from a part where the strength is low. As a result, it becomes difficult to increase the durability of the shoe press belt.

The present inventors have made an intensive research to find out its cause, and found that, in general, when a urethane prepolymer is prepared using a polycarbonate diol, the viscosities of the urethane prepolymer and of a urethane composition in which a curing agent and the urethane prepolymer have been mixed are greatly increased, and thus the urethane composition cannot be uniformly discharged and applied at the time of producing a shoe press belt. In this case, it is difficult to form a uniform polyurethane layer.

On the other hand, the present inventors also found that, when a polyether polycarbonate diol X comprising a unit A expressed by the formula (1) described above is used, an increase in the viscosity of the resulting urethane composition is suppressed and therefore a uniform polyurethane resin layer can be formed. It is also found that, when a resin layer is formed using the polyether polycarbonate diol X described above in such a way, not only the unevenness in strength among parts of the shoe press belt is suppressed, but also the strength of the shoe press belt is increased as a whole.

Unless specifically mentioned, unevenness "among parts" herein refers to the unevenness among any parts of a resin layer that constitutes the shoe press belt, namely a resin layer formed with one material, in the surface direction. For instance, in the shoe press belt 1 according to the present embodiment, for each of the reinforcing fibrous substrate layer 10, the first resin layer 20 and the second resin layer 30, any parts of each resin layer in its surface direction can be compared. Moreover, the unevenness in strength among parts in each resin layer has a composite influence on the shoe press belt, constituting the unevenness in strength among parts in the shoe press belt itself.

Here, it has been known that a polyurethane resin using a polycarbonate diol generally has a high crystallinity and excellent strength. In addition, it has been found that, in the present embodiment, a shoe press belt 1 obtainable using a polyether polycarbonate diol X comprising a unit A expressed by the formula (1) described above has a strength that is comparable with a case using polycarbonate diol.

In particular, the first resin layer 20 constitutes the outer circumferential surface 21 of the shoe press belt 1. In the shoe press belt 1, the outer circumferential surface 21 is a part that is prone to the abrasion of the shoe press belt 1 associated to the contact and friction with a felt, etc. during the use of the shoe press belt 1 and damages such as cracks due to the bending fatigue of the shoe press belt 1. Therefore, the durability of the shoe press belt 1 will be improved by comprising a polyurethane resin formed by using a polyether polycarbonate diol X in the first resin layer 20, which constitutes the outer circumferential surface 21 of the shoe press belt 1.

In the above-mentioned formula (1), $R^1$ is a bivalent group derived from a polyether polyol having the number average molecular weight equal to or higher than 200 and equal to or less than 3,000. Provided that $R^1$ is derived from a polyether polyol of an adequate number average molecular weight as above, when using the polyether polycarbonate diol X, the viscosity increase of the resulting urethane composition will appropriately be suppressed, and it is possible to form a first resin layer 20 with more uniform polyurethane.

For instance, $R^1$ can be a group expressed by the formula (2) below:

(2)

in the formula (2):
$R^2$ is, for each occurrence, independently identical or different, and is a straight-chain, branched or cyclic alkylene group having 1 or more and 20 or less carbon atom(s), and
n is an integer equal to or more than 2 and equal to or less than 42.

Straight-chain alkylene groups of $R^2$ include, for example, methylene group, ethylene group, n-propylene group, n-butylene group, n-pentylene group, n-hexylene group, n-heptylene group, n-octylene group, n-nonylene group, n-decylene group, n-undecylene group, n-dodecylene group, n-tridecylene group, n-tetradecylene group, n-penta- decylene group, n-hexadecylene group, n-heptadecylene group, n-octadecylene group, n-nonadecylene group and n-icosylene group, etc. Branched alkylene groups of $R^2$ include, for example, 1-methylpropylene group, 2-methylpropylene group, 1,1-dimethylpropylene group, 1,2-dimethylpropylene group, 1,3-dimethylpropylene group, 2,2-dimethylpropylene group, 1,2,3-trimethylpropylene group, 1,1,2-trimethylpropylene group, 1,2,2-trimethylpropylene group, 1,1,3-trimethylpropylene group, 1-methylbutylene group, 2-methylbutylene group, 1,1-dimethylbutylene group, 1,2-dimethylbutylene group, 1,3-dimethylbutylene group, 1,4-dimethylbutylene group, 2,2-dimethylbutylene group, 2,3-dimethylbutylene group, 1,2,3-trimethylbutylene group, 1,2,4-trimethylbutylene group, 1,1,2-trimethylbutylene group, 1,2,2-trimethylbutylene group, 1,3,3-trimethylbutylene group, 1-methylpentylene group, 2-methylpentylene group, 3-methylpentylene group, 1-methylhexylene group, 2-methylhexylene group and 3-methylhexylene group, etc. A cyclic alkylene group of $R^2$ can be, for example, a group that has a alicyclic group such as a cyclopentane ring, cyclohexane ring, cycloheptane ring or cyclooctane ring. In this case, the cyclic alkylene group is bound to an adjacent oxygen atom directly from the alicyclic group or via an alkylene group having 1 to 3 carbon atoms which is substituted for the alicyclic group. Such cyclic alkylene groups include, for example, 1,4-cyclohexane-diylbismethylene group.

The number of carbon atoms of $R^2$ is, equal to or more than 1 and equal to or less than 20 as mentioned above, preferably equal to or more than 1 and equal to or less than 15, and more preferably, equal to or more than 2 and equal to or less than 8.

$R^2$ is, preferably, a straight-chain alkylene group having 1 or more and 15 or less carbon atoms, more preferably, a straight-chain alkylene group having 1 or more and 8 or less carbon atoms, further preferably, one selected from the group consisting of an ethylene group, n-propylene group, n-butylene group and n-hexylene group. By this, the viscosity of the resulting urethane composition and the unevenness among parts of the shoe press belt 1 can further be suppressed, and at the same time, the strength of the shoe press belt 1 will further be improved.

n may be an integer equal to or more than 2 and equal to or less than 42, preferably, 3 or more and 14 or less.

The aforementioned polyether polycarbonate diol X is, for example, expressed by the following formula (3):

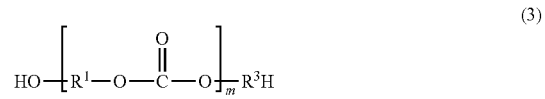

(3)

In the formula (3), R1 and R3 are each independently a bivalent group derived from a polyether polyol having the number average molecular weight equal to or higher than 200 and equal to or less than 3,000, and m is an integer equal to or more than 1 and equal to or less than 34.

Since $R^1$ is similar to $R^1$ in the aforementioned formula (1), $R^3$ can be a similar group as $R^1$, repeated detailed description shall be omitted. Moreover, $R^1$ and $R^3$ may be different or identical. However, in view of a method for producing the polyether polycarbonate diol X, $R^3$ is usually identical to $R^1$.

When the polyether polycarbonate diol X comprises more than one type of $R^1$, their arrangement is not particularly limited. That is, the polyether polycarbonate diol X may be a random copolymer, alternating copolymer or block copolymer.

The number average molecular weight of the polyether polycarbonate diol X described above is not particularly limited, though, it can be, for example, equal to or more than 250 and equal to or less than 4000, preferably, equal to or more than 500 and equal to or less than 3000. The number average molecular weight of the polyether polycarbonate diol can be calculated, for example, by measuring the hydroxyl value.

Specifically, first, the hydroxyl value of the polyether polycarbonate diol X is measured. The hydroxyl value of the polyether polycarbonate diol X can be measured in conformity to JIS K 1557-1:2007. On the other hand, the hydroxyl value of the polyether polycarbonate diol X (mgKOH/g) can also be expressed as in the following formula 1:

(The hydroxyl value of the polyether polycarbonate diol $X$ (mgKOH/g))=56110/(The number average molecular weight of the polyether polycarbonate diol $X$)×(The average number of hydroxyl groups per one molecule of the polyether polycarbonate diol $X$)  (I)

Here, the average number of hydroxyl groups per one molecule of the polyether polycarbonate diol X is estimated to be 2.0. Therefore, the number average molecular weight of the polyether polycarbonate diol X can be expressed as the following formula (II):

(The number average molecular weight of the polyether polycarbonate diol $X$)=112,220/(The hydroxyl value of the polyether polycarbonate diol $X$ (mgKOH/g))  (II)

In the formula (II) described above, the number average molecular weight of the polyether polycarbonate diol X can be calculated by substituting the hydroxyl value of the polyether polycarbonate diol X obtained by measuring the hydroxyl value.

The combined amount of the polyether polycarbonate diol X described above is not particularly limited, though it is preferably equal to or higher than 10% by mass and equal to or less than 90% by mass, more preferably equal to or higher than 20% by mass and equal to or less than 80% by mass, based on the total resin weight of the part in which the polyether polycarbonate diol X described above is used. By this the strength of the shoe press belt 1 can further be improved, and at the same time the unevenness in strength among parts of the shoe press belt 1 can further be suppressed. Note that the combined amount described above is a proportion based on the amount of the resin in the resin 23, excluding inorganic fillers described later.

Furthermore, at the time of forming the resin 23 of the first resin layer 20, the timing when the polyether polycarbonate diol X described above is added is not particularly limited. For instance, the polyether polycarbonate diol X described above can be added at the timing of the following (i) to (iv). Hereinbelow, the components of the resin 23 will be explained for each case of (i) to (iv).

(i) When being Contained in a Urethane Prepolymer

For instance, the polyether polycarbonate diol X can be used as a component of a urethane prepolymer. Specifically, the resin 23 can be a polyurethane resin that is obtainable by reacting a urethane prepolymer having an isocyanate group comprising as (a) component(s) one or more polyether polycarbonate diol(s) X with a curing agent having an active hydrogen group.

That is, in this case, the urethane prepolymer can be one that is obtainable by reacting a polyisocyanate compound with a polyol compound comprising one or more polyether polycarbonate diol(s) X. This makes it possible to combine a relatively large amount of the polyether polycarbonate diol X, which can further improve the strength of the shoe press belt 1. More than one type of polyether polycarbonate diol X can be used to constitute the urethane prepolymer.

In this case, the polyisocyanate compound that constitute the urethane prepolymer is not particularly limited, though, for example, one or more polyisocyanate compounds selected from an aromatic polyisocyanate and an aliphatic polyisocyanate can be used, and it can be, preferably, (a) polyisocyanate compound(s) comprising (a) compound(s) selected from 2,4-tolylene-diisocyanate (2,4-TDI), 2,6-tolylene-diisocyanate (2,6-TDI), 4,4'-methylenebis(phenylisocyanate) (MDI), p-phenylene-diisocyanate (PPDI), dimethylbiphenylene diisocyanate (TODI), naphthalene-1,5-diisocyanate (NDI), 4,4-dibenzyldiisocyanate (DBDI), 1,6-hexamethylene diisocyanate (HDI), 1,5-pentamethylene diisocyanate, 1-isocyanate-3-isocyanatemethyl-3,5,5-trimethylcyclohexane (IPDI), dicyclohexylmethane 4,4'-diisocyanate (H12MDI), xylylene diisocyanate (XDI), cyclohexane diisocyanate (CHDI), 1,4-bis(isocyanate methyl) cyclohexane (H6XDI) and tetramethylxylylenediisocyanate (TMXDI), and polymethylene polyphenyl polyisocyanate (polymeric MDI) and a mixture thereof.

In order to further suppress the unevenness among parts of the resulting resin 23, the polyisocyanate compound preferably comprises one or more selected from the group consisting of hexamethylene diisocyanate, dicyclohexylmethane 4,4'-diisocyanate, xylylene diisocyanate, naphthalene-1,5-diisocyanate, dimethylbiphenylene diisocyanate, p-phenylene-diisocyanate, 4,4'-methylenebis(phenylisocyanate), 2,4-tolylene-diisocyanate, 2,6-tolylene-diisocyanate and 1,4-bis(isocyanatemethyl)cyclohexane, more preferably one or more selected from the group consisting of p-phenylene-diisocyanate, 4,4'-methylenebis(phenylisocyanate), dimethylbiphenylene diisocyanate, 2,4-tolylene-diisocyanate, 2,6-tolylene-diisocyanate and 1,4-bis(isocyanatemethyl)cyclohexane.

The polyol compound comprises the polyether polycarbonate diol X described above, though it may comprise other polyol compounds. Such polyol compounds include, without limitation, for example, long-chain polyol compounds, in specific, polyester polyols such as polycaprolactone polyol, and polyethylene adipate, polyether polyols such as polyethylene glycol, polyoxypropylene glycol, polyhexamethylene ether glycol and polytetramethylene ether glycol (PTMG), polycarbonate diols, trimethylol propane, polybutadiene polyol, perfluoropolyether polyol, silicon polyols such as silicon diol, etc., which may be used alone or in combination of two or more.

Polycarbonate polyols include, though not being particularly limited, for example, a polycarbonate polyol synthesized from a polyol that is a material for a polycarbonate polyol and a polycarbonate source. The polyol that is a material for a polycarbonate polyol includes, though not being particularly limited, for example, a straight- or branched chain alkylene glycol having 2 or more and 20 or less carbon atoms, a hydroxyl group-containing cyclic hydrocarbon having 3 or more and 20 or less carbon atoms, etc., which may be used alone or in combination of two or more. The straight-chain alkylene glycol described above includes, for example, ethylene glycol, propanediol, butanediol, pentanediol, hexanediol, heptanediol, octanediol, nonanediol, decanediol, undecanediol, dodecanediol, etc. The branched chain alkylene glycol described above includes, for example, 2-methyl-1,3-propanediol, 2,2-dimethyl-1,3-propanediol, 3-methyl-1,5-pentanediol, 2-methyl-1,8-octanediol, etc. The hydroxyl group-containing cyclic hydrocarbon described above includes, for example, hydroxyl group-containing alicyclic alkanes such as 1,3-cyclohexanediol, 1,4-cyclohexanediol and 1,4-cyclohexane dimethanol. The polycarbonate source is not particularly limited. When the polycarbonate source is synthesized into a polycarbonate polyol, it becomes a carbonyl group that binds groups derived from the polyol.

In order to increase the hydrolysis resistance of the resin 23 and further improve the durability of the shoe press belt 1, the polyol compound preferably comprises a polyether polyol and/or a polycarbonate diol, more preferably polytetramethylene ether glycol and/or polyhexamethylene carbonate diol, in addition to the polyether polycarbonate diol X expressed by the formula (1) described above.

When the urethane prepolymer comprises a polyol compound other than the polyether polycarbonate diol X described above, the proportion of the polyether polycarbonate diol X against all polyol compound in the urethane prepolymer is, for example, equal to or higher than 10% by mass and less than 90% by mass, preferably equal to or higher than 25% by mass and equal to or less than 80% by mass. On the other hand, the polyol compound in the urethane prepolymer more preferably consists essentially of the polyether polycarbonate diol X, further preferably consists of the polyether polycarbonate diol X.

The NCO content of the aforementioned urethane prepolymer is not particularly limited, though it can be, for example, equal to or higher than 3.0% and equal to or less than 15%, preferably, equal to or higher than 4.0% and equal to or less than 12%. The NCO content of the urethane prepolymer can be the isocyanate group content of the urethane prepolymer measured in conformity to Method A described in K 1603-1:2007.

The curing agent having an active hydrogen group is not particularly limited, and a curing agent comprising one or more compound(s) selected from a group consisting of polyol compounds and polyamines can be used.

As polyol compounds that can be contained in the curing agent, in addition to the aforementioned long-chain polyol compounds, various aliphatic polyol compounds and various alicyclic or aromatic polyol compounds can be used.

Aliphatic polyol compounds include, though not being particularly limited, for example, alkylene glycol compounds such as ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, 1,20-icosanediol, 2-methyl-1,3-propanediol, neopentyl glycol, 2-butyl-2-ethyl-1,3-propanediol, 3-methyl-1,5-pentanediol, 2-ethyl-1,3-hexanediol and 2-methyl-1,8-octanediol, and glycerin, ditrimethylol propane, trimethylol propane (TMP), pentaerythritol, dihydroxymethyl propionate (DHPA), etc.

Alicyclic polyol compounds include, though not being particularly limited, for example, 1,4-cyclohexane dimethanol, hydrogenated bisphenol A, etc.

Aromatic polyol compounds include, though not being particularly limited, for example, hydroquinonebis-R-hydroxyethyl ether (HQEE), hydroxyphenylether resorcinol (HER), 1,3-bis(2-hydroxyethoxybenzene), 1,4-bis(2-hydroxyethoxybenzene), bisphenol A, an alkylene oxide adduct of bisphenol A, bisphenol S, an alkylene oxide adduct of bisphenol S, etc.

Polyamines include, though not being particularly limited, hydrazine, ethylene diamine, 4,4'-methylene-bis-(2-chloroaniline) (MOCA), dimethylthiotoluene diamine (DMTDA), diethylthiotoluene diamine, diethyltoluene diamine (DETDA), trimethylene glycol di(p-aminobenzoate) (TMAB), 4,4'-methylene-bis-(3-chloro-2,6-diethylaniline) (MCDEA), 4,4'-methylene-bis-(2,6-diethylaniline) (MDEA), triisopropanol amine (TIPA), p-bis(aminocyclohexyl)methane (PACM), naphthalene-1,5-diamine, xylylene diamine, phenylene diamine, toluene-2,4-diamine, t-butyl toluene diamine, 1,2-bis(2-aminophenylthioethane).

Among those mentioned above, in order to further improve the strength of the resulting resin 23 and at the same time to further suppress the unevenness in strength among parts of the shoe press belt 1, the curing agent comprises preferably one or more selected from the group consisting of polyamine, aliphatic polyol compound and aromatic polyol compound, more preferably one or more selected from the group consisting of 4,4'-methylene-bis-(2-chloroaniline) (MOCA), dimethylthiotoluene diamine (DMTDA), diethyltoluene diamine (DETDA), 4,4'-methylene-bis-(3-chloro-2,6-diethylaniline) (MCDEA), hydroquinonebis-β-hydroxyethyl ether (HQEE) and 1,4-butanediol.

In particular, the curing agent preferably comprises a polyamine, more preferably one or more selected from the group consisting of 4,4'-methylene-bis-(2-chloroaniline) (MOCA), dimethylthiotoluene diamine (DMTDA), diethyltoluene diamine (DETDA), and 4,4'-methylene-bis-(3-chloro-2,6-diethylaniline) (MCDEA).

Moreover, the resin 23 may comprise an inorganic filler such as titanium oxide, kaoline, clay, talc, diatomaceous earth, calcium carbonate, calcium silicate, magnesium silicate, silica and mica, either alone or in combination of two or more.

(ii) When being Contained in a Curing Agent

The polyether polycarbonate diol X may also be used, for example, as a component of the curing agent. Specifically, the resin 23 can be a polyurethane resin that is obtainable by reacting a urethane prepolymer having an isocyanate group with a curing agent having an active hydrogen group comprising one or more of the polyether polycarbonate diol(s) X. By including one or more of the polyether polycarbonate diol(s) X in the curing agent, the combined viscosity of the urethane composition comprising the urethane prepolymer and the curing agent can also be decreased. Accordingly, it is possible to improve the strength of the shoe press belt 1, while further suppressing the unevenness in strength among parts.

In this case, as the polyisocyanate compound of the urethane prepolymer, for example, various polyisocyanate compounds in (i) mentioned above can be used. The polyisocyanate compound preferably comprises one or more selected from the group consisting of hexamethylene diisocyanate, dicyclohexylmethane 4,4'-diisocyanate, xylylene diisocyanate, naphthalene-1,5-diisocyanate, dimethylbiphenylene diisocyanate, p-phenylene-diisocyanate, 4,4'-methylenebis(phenylisocyanate), 2,4-tolylene-diisocyanate, 2,6-tolylene-diisocyanate and 1,4-bis(isocyanatemethyl)cyclohexane, more preferably one or more selected from the group consisting of p-phenylene-diisocyanate, 4,4'-methylenebis(phenylisocyanate), dimethylbiphenylene diisocyanate, 2,4-tolylene-diisocyanate, 2,6-tolylene-diisocyanate and 1,4-bis(isocyanatemethyl)cyclohexane.

As the polyol compound of the urethane prepolymer, for example, various polyol compounds in (i) mentioned above can be used. In order to increase the hydrolysis resistance of the resin 23 and further improve the durability of the shoe press belt 1, the polyol compound preferably comprises a polyether polyol and/or polycarbonate diol, more preferably polytetramethylene ether glycol and/or polyhexamethylene carbonate diol.

As mentioned above, in the case of (ii), the curing agent comprises one or more of the polyether polycarbonate diol(s) X. Moreover, the curing agent may comprise other curing agents in addition to the one or more polyether polycarbonate diol(s) X. As such curing agent, a curing agent that can be used in the case of (i) mentioned above can be used.

In this case, the curing agent preferably comprises one or more selected from the group consisting of polyamine, aliphatic polyol compound and aromatic polyol compound, more preferably one or more selected from the group consisting of 4,4'-methylene-bis-(2-chloroaniline) (MOCA), dimethylthiotoluene diamine (DMTDA), diethyltoluene diamine (DETDA), 4,4'-methylene-bis-(3-chloro-2,6-diethylaniline) (MCDEA), hydroquinonebis-β-hydroxyethyl ether (HQEE) and 1,4-butanediol, in addition to the one or more polyether polycarbonate diol(s) X.

Alternatively, the curing agent preferably comprises a polyamine, more preferably one or more selected from the group consisting of 4,4'-methylene-bis-(2-chloroaniline) (MOCA), dimethylthiotoluene diamine (DMTDA), diethyltoluene diamine (DETDA), and 4,4'-methylene-bis-(3-chloro-2,6-diethylaniline) (MCDEA), in addition to the one or more polyether polycarbonate diol(s) X.

When the curing agent comprises a curing agent other than the one or more polyether polycarbonate diol(s) X, the proportion of the one or more polyether polycarbonate diol(s) X in the curing agent is, for example, equal to or higher than 10% by mass and less than 100% by mass, preferably equal to or higher than 50% by mass and equal to or less than 95% by mass.

Moreover, the resin 23 may comprise an inorganic filler such as titanium oxide, kaoline, clay, talc, diatomaceous earth, calcium carbonate, calcium silicate, magnesium silicate, silica and mica, either alone or in combination of two or more.

(iii) When being Contained in a Urethane Prepolymer and a Curing Agent

The one or more polyether polycarbonate diol(s) X may be contained as (a) component(s) in both the urethane prepolymer and the curing agent. Specifically, the resin 23 can be a polyurethane resin that is obtainable by reacting a urethane prepolymer having an isocyanate group comprising as (a) component(s) one or more of the polyether polycarbonate diol(s) X with a curing agent having an active hydrogen group comprising one or more of the polyether polycarbonate diol(s) X.

In this case, as the polyisocyanate compound of the urethane prepolymer, for example, various polyisocyanate compounds in (i) mentioned above can be used. The polyisocyanate compound preferably comprises one or more selected from the group consisting of hexamethylene diisocyanate, dicyclohexylmethane 4,4'-diisocyanate, xylylene diisocyanate, naphthalene diisocyanate, p-phenylene-diisocyanate, 4,4'-methylenebis(phenylisocyanate), dimethylbiphenylene diisocyanate, 2,4-tolylene-diisocyanate, 2,6-tolylene-diisocyanate and 1,4-bis(isocyanatemethyl) cyclohexane, more preferably one or more selected from the group consisting of p-phenylene-diisocyanate, 4,4'-methyl-enebis(phenylisocyanate), dimethylbiphenylene diisocyanate, 2,4-tolylene-diisocyanate, 2,6-tolylene-diisocyanate and 1,4-bis(isocyanatemethyl)cyclohexane.

In the case of (iii), the urethane prepolymer comprises the polyether polycarbonate diol X, though it may also comprise other polyol compounds. In order to further suppress the unevenness in strength among parts of the shoe press belt 1 and at the same time further improve the strength of the shoe press belt 1, the polyol compound preferably comprises a polyether polyol and/or polycarbonate diol, more preferably polytetramethylene ether glycol and/or polyhexamethylene carbonate diol.

When the urethane prepolymer comprises a polyol compound other than the polyether polycarbonate diol X, the proportion of the polyether polycarbonate diol X against all polyol compounds in the urethane prepolymer is, for example, equal to or higher than 10% by mass and less than 90% by mass, preferably equal to or higher than 25% by mass and equal to or less than 80% by mass. On the other hand, the polyol compound in the urethane prepolymer more preferably consists essentially of the polyether polycarbonate diol X, further preferably consists of the polyether polycarbonate diol X.

As mentioned above, in the case of (iii), the curing agent comprises one or more of the polyether polycarbonate diol(s) X. Moreover, the curing agent may comprise other curing agents in addition to one or more of the polyether polycarbonate diol(s) X. As such curing agent, a curing agent that can be used in the case of (i) mentioned above can be used.

In this case, the curing agent preferably comprises one or more selected from the group consisting of polyamine, aliphatic polyol compound and aromatic polyol compound, more preferably one or more selected from the group consisting of 4,4'-methylene-bis-(2-chloroaniline) (MOCA), dimethylthiotoluene diamine (DMTDA), diethyltoluene diamine (DETDA), 4,4'-methylene-bis-(3-chloro-2,6-diethylaniline) (MCDEA), hydroquinonebis-R-hydroxyethyl ether (HQEE) and 1,4-butanediol, in addition to the one or more polyether polycarbonate diol(s) X.

In particular, the curing agent preferably comprises a polyamine, more preferably one or more selected from the group consisting of 4,4'-methylene-bis-(2-chloroaniline) (MOCA), dimethylthiotoluene diamine (DMTDA), diethyltoluene diamine (DETDA), and 4,4'-methylene-bis-(3-chloro-2,6-diethylaniline) (MCDEA), in addition to the one or more polyether polycarbonate diol(s) X.

When the curing agent comprises a curing agent other than the one or more polyether polycarbonate diol(s) X, the proportion of the one or more polyether polycarbonate diol(s) X in the curing agent is, for example, equal to or higher than 10% by mass and less than 100% by mass, preferably equal to or higher than 50% by mass and equal to or less than 95% by mass.

Moreover, the resin 23 may comprise an inorganic filler such as titanium oxide, kaoline, clay, talc, diatomaceous earth, calcium carbonate, calcium silicate, magnesium silicate, silica and mica, either alone or in combination of two or more.

(iv) When Forming the Polyurethane Resin by One-Shot Process

In (i) to (iii) mentioned above, the urethane prepolymer is cured with a curing agent to form a polyurethane resin, though a polyurethane resin may also be formed by one-shot process.

In this case, one or more of the polyether polycarbonate diol(s) X and the polyisocyanate compound described in detail in (i) mentioned above, as well as, as necessary, the polyol compounds, curing agents and/or inorganic fillers described in detail in the description of urethane prepolymers can be mixed, and the resulting urethane composition can be cured to form a polyurethane resin as the resin 23 of the first resin layer 20.

The hardness of the first resin layer 20 formed with the aforementioned polyurethane resin as measured in conformity to JIS K 6301:1995 using a spring-type hardness-testing machine type-A is not particularly limited, though it is, for example, at 22° C., equal to or higher than 90 HS JISA and equal to or less than 98 HS JISA, preferably, equal to or higher than 91 HS JISA and equal to or less than 97 HS JISA. Thus, the durability of the first resin layer 20 can sufficiently be increased.

Moreover, for each of (i) to (iv), when a polyurethane resin formed by using the polyether polycarbonate diol X is contained in either the resin 33 of the second resin layer or the resin 13 of the reinforcing fibrous substrate layer 10, the first resin layer 20 does not have to comprise the aforementioned polyurethane resin. In this case, as materials for the resin 23 of the first resin layer 20, a thermosetting resin such as a polyurethane resin (which does not comprise a polyether polycarbonate diol X as its component), an epoxy resin and acrylic resin, or a thermoplastic resin such as polyamide, polyacrylate and polyester can be used alone or in combination of two or more.

As the resin 33 which constitutes the second resin layer 30, the resin materials as mentioned above which can be used in the first resin layer 20 can be used alone or in combination of two or more. The resin 33 which constitutes the second resin layer 30 may be identical to or different from the resin 23 which constitutes the first resin layer 20 regarding its type and composition. In particular, as the resin 33 which constitutes the second resin layer 30, from a viewpoint of improving the durability of the second resin layer 30, and from a viewpoint of improving resin production efficiency, it is preferred to be identical to the resin 23 of the first resin layer 20.

Moreover, the second resin layer 30 preferably comprises a polyurethane resin formed by using the polyether polycarbonate diol X. The second resin layer 30 constitutes the inner circumferential surface 31 of the shoe press belt 1. In the shoe press belt 1, the inner circumferential surface 31 is a part that is prone to the friction with the shoe during the use of the shoe press belt 1 and damages such as a crack due to the bending fatigue of the shoe press belt 1. Therefore, by including the polyurethane resin formed by using the polyether polycarbonate diol X in the second resin layer 30 which constitutes the inner circumferential surface 21 of the shoe press belt 1, the durability of the shoe press belt 1 will be improved.

As the resin 13 which constitutes the reinforcing fibrous substrate layer 10, the resin materials as mentioned above which can be used in the first resin layer 20 can be used alone or in combination of two or more. The resin 13 which constitutes the reinforcing fibrous substrate layer 10 may be identical to or different from the resin 23 which constitutes the first resin layer 20 regarding its type and composition. In particular, as the resin 13 which constitutes the reinforcing fibrous substrate layer 10, from a viewpoint of improving resin producing efficiency, it is preferred to be identical to the resin 23 of the first resin layer 20.

The reinforcing fibrous substrate layer 10 preferably comprises a polyurethane resin formed by using the polyether polycarbonate diol X. This will improve the durability of the shoe press belt 1.

The dimensions of the shoe press belt 1 as mentioned above is not particularly limited, and can appropriately be set according to its intended use.

For instance, the width of the shoe press belt 1 is not particularly limited, though it can be equal to or more than 700 mm and equal to or less than 13500 mm, preferably equal to or more than 2500 mm and equal to or less than 12500 mm.

Moreover, for instance, the length (circumference) of the shoe press belt 1 is not particularly limited, though it can be equal to or more than 150 cm and equal to or less than 1500 cm, preferably equal to or more than 200 cm and equal to or less than 1100 cm.

The thickness of the shoe press belt 1 is not particularly limited, though it can be, for example, equal to or more than 1.5 mm and equal to or less than 7.0 mm, preferably equal to or more than 2.0 mm and equal to or less than 6.0 mm.

The thickness of the shoe press belt 1 may be different at each different part, or it may be identical.

As above, in the shoe press belt 1 according to the present embodiment, at least one of the resin 13 of the reinforcing fibrous substrate layer 10, the resin 23 of the first resin layer 20 and the resin 33 of the second resin layer 30 comprises a polyurethane resin which comprises as a component the polyether polycarbonate diol X described above.

Accordingly, the shoe press belt 1 has suppressed unevenness in strength among parts, and is excellent in strength.

Figure 2:
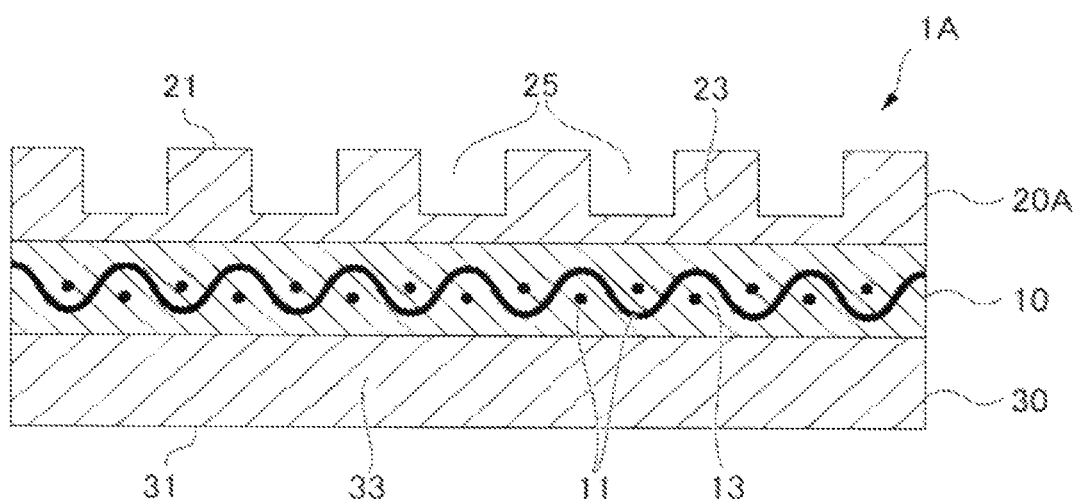
FIG. 2 is a cross-sectional view in a cross machine direction showing a papermaking device according to another embodiment of the present invention.

Next, papermaking devices according to other embodiments will be explained. FIG. 2 is a cross-sectional view in a cross machine direction showing a papermaking device according to another embodiment of the present invention. Hereinbelow, differences between the aforementioned embodiment will be mainly explained, and description of similar matters shall be omitted.

As shown in FIG. 2, in the shoe press belt 1A, which is a papermaking device, multiple drain grooves 25 have been formed on the outer circumferential surface 21 of the first resin layer 20A. When a shoe press belt 1A which has drain grooves 25 is used, more water can be removed from the wet paper web being carried by the shoe press belt 1A.

The configuration of the drain grooves 25 is not particularly limited, though, usually, in general, multiple continuous drain grooves are formed in parallel in the machine direction of the shoe press belt 1A. For instance, the groove width can be set to be equal to or more than 0.5 mm and equal to or less than 2.0 mm, the groove depth can be set to be equal to or more than 0.4 mm and equal to or less than 2.0 mm, the number of drain grooves can be set to be equal to or more than 5 and equal to or less than 20 drain grooves/inch. Moreover, the cross-sectional shape of the drain 25 may be set as appropriate, such as a rectangle, trapezoidal, U-shaped, or it may be set such that the parts where the land and groove bottom are met with the groove wall are rounded.

Moreover, the configurations of these drain grooves 25 may be the same regarding the groove width and depth, the number of drain grooves and the cross-sectional shape, or the drain grooves of different configurations may be combined. Furthermore, these drain grooves 25 may be formed as discontinuous bodies, or may be formed as multiple drain grooves which are arranged in parallel to the cross machine direction.

As above, in the shoe press belt 1A, too, at least any one of the resin 13 of the reinforcing fibrous substrate layer 10, the resin 23 of the first resin layer 20A and the resin 33 of the second resin layer 30 comprises a polyurethane resin which comprises the polyether polycarbonate diol X described above as a component. Accordingly, the shoe press belt 1A has suppressed unevenness in strength among parts, and is excellent in strength.

In the description above, cases in which the papermaking device is a shoe press belt has been explained as one example of the present invention, though the present invention is not limited thereto, and it may be any papermaking device having a resin layer.

For instance, a papermaking device according to the present invention can be a papermaking belt such as a wet paper web transfer belt for carrying out the transfer and delivery of a wet paper web (transfer belt), or a papermaking roll such as a press roll used in a roll press mechanism.

A papermaking belt such as a wet paper web transfer belt is also usually provided with a resin layer. Therefore, for the resin layer of the papermaking belt, a polyurethane resin which comprises as a component the aforementioned polyether polycarbonate diol X can be used to produce a papermaking belt having a resin layer in which the unevenness in strength between its parts is suppressed, and which has an excellent strength. In particular, a papermaking belt is different from a papermaking roll, etc., in that its resin layer is not carried by any other member. Accordingly, it is extremely important to suppress the unevenness in strength among parts in the papermaking belt.

Moreover, in a papermaking roll such as a press roll, too, its circumference side surfaces may be composed of a resin layer. In this case, for the resin layer of a papermaking roll, a polyurethane resin which comprises as a component the aforementioned polyether polycarbonate diol X can be used to produce a papermaking roll having a resin layer in which the unevenness in strength between its parts is suppressed, and which has an excellent strength.

<2. Method for Producing Papermaking Device>

Figure 3:
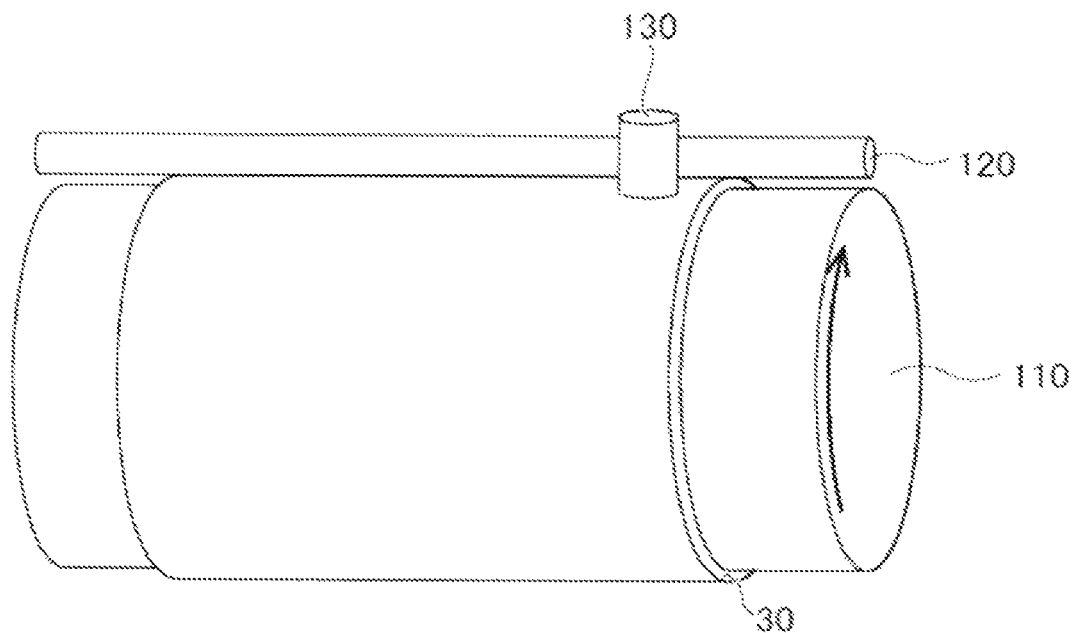
FIG. 3 is a schematic drawing for illustrating a preferred embodiment of a method for producing a papermaking device according to the present invention.
Figure 4:
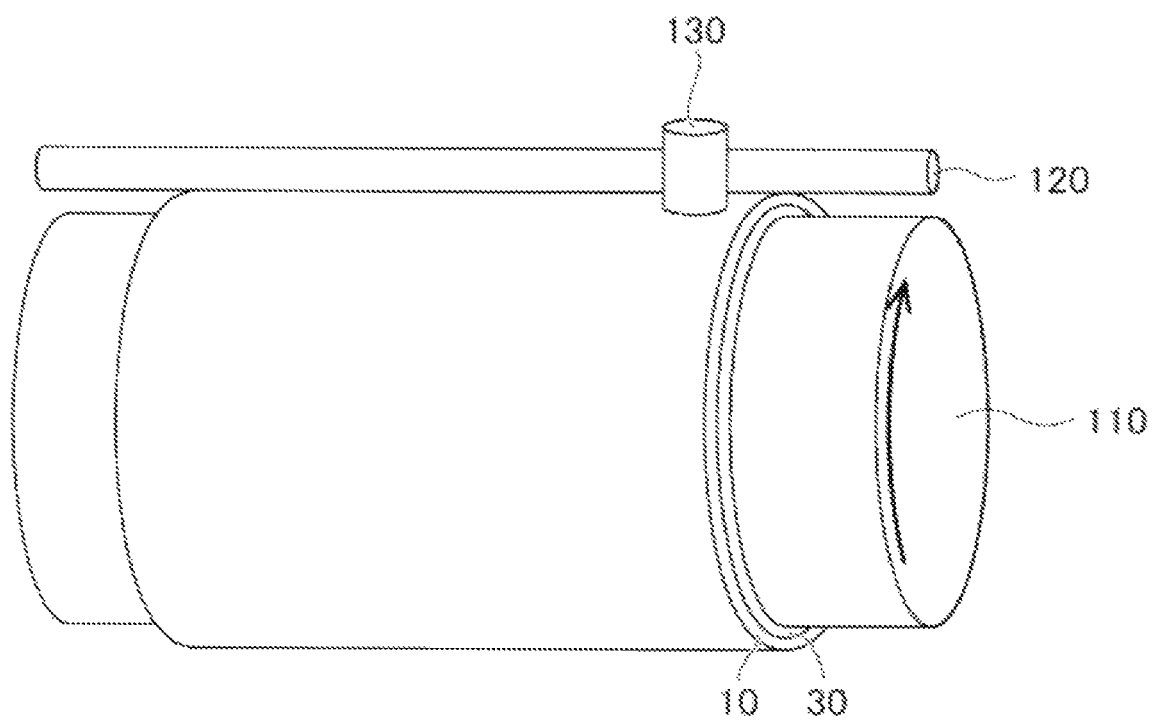
FIG. 4 is a schematic drawing for illustrating a preferred embodiment of a method for producing a papermaking device according to the present invention.
Figure 5:
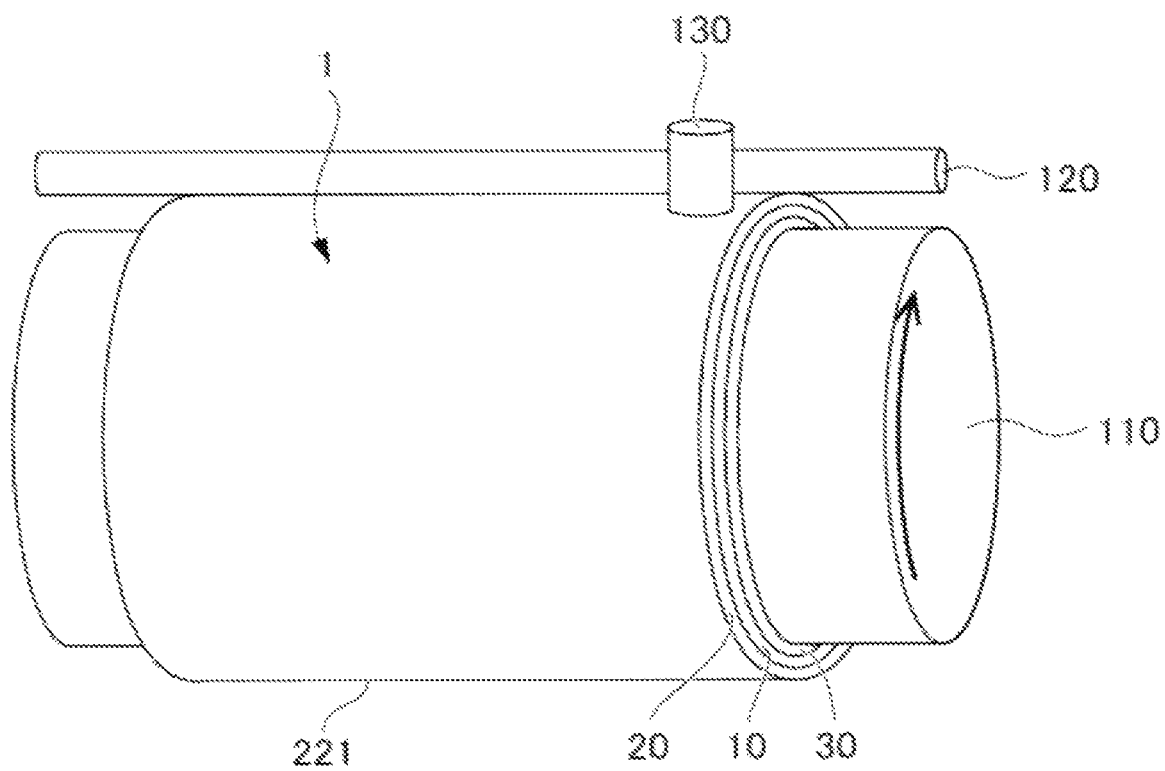
FIG. 5 is a schematic drawing for illustrating a preferred embodiment of a method for producing a papermaking device according to the present invention.

Next, preferred embodiments of the method for producing the papermaking device of the present invention will be described. FIGS. 3 to 5 are schematic drawings illustrating preferred embodiments of the method for producing the papermaking device.

A method for producing a papermaking device according to the present invention is a method for producing a papermaking device for use in a papermaking machine, comprising a step of forming a resin layer comprising a polyurethane resin by curing a polyurethane material, wherein:
the polyurethane material comprises as a component a polyether polycarbonate diol comprising one or more unit(s) A expressed by the following formula (1):

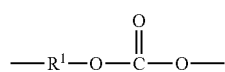

(1)

in the formula (1):
R¹ is a bivalent group derived from a polyether polyol having the number average molecular weight equal to or higher than 200 and equal to or less than 3,000.

Note that, in the present embodiment, a method for producing a shoe press belt will be explained as one example of papermaking device, though it goes without saying that the method for producing the papermaking device according to the present invention is not limited to the method for producing a shoe press belt. Moreover, in the present embodiment, the method for producing a shoe press belt as a papermaking device comprises a resin layer-forming step in which a first resin layer 20, a reinforcing fibrous substrate layer 10, and a second resin layer 30 are formed.

In the resin layer-forming step, the resin layer is to be formed. In this step, specifically, a laminated body is formed comprising a reinforcing fibrous substrate layer 10 in which an annular and band-shaped reinforcing fibrous substrate 11 is embedded in a resin 13, and a first resin layer 20 and a second resin layer 30 which are laminated on both sides of the reinforcing fibrous substrate layer 10.

The formation of such laminated body can be made by any method, though, in the present embodiment, a second resin layer 30 is formed. Then, on one surface of the second resin layer 30 a reinforcing fibrous substrate 11 is deposited, and to the reinforcing fibrous substrate 11 a resin material is applied, allowed to be impregnated and penetrate into it, to form a laminated body in which the reinforcing fibrous substrate layer 10 and the second resin layer 30 are integrated. Then, on a surface of the reinforcing fibrous substrate layer 10 that is oriented opposite to the bonding plane of the reinforcing fibrous substrate layer 10 with the second resin layer 30, a first resin layer 20 is formed.

Specifically, for instance, first, as shown in FIG. 3, a resin material is applied to the surface of the mandrel 110 on which a release agent has been applied, while rotating the mandrel 110, such that the thickness of the resin will be from 0.8 to 3.5 mm. This forms a resin precursor layer that is to be the second resin layer 30. Then, the temperature of the resin precursor layer is risen to between 40 and 140° C., pre-cured it for 0.5 to 1 hour to form the second resin layer 30.

Then, the reinforcing fibrous substrate 11 is disposed onto the pre-cured second resin layer 30 (not illustrated), and, as shown in FIG. 4, while rotating the mandrel 110, a resin material which will form the reinforcing fibrous substrate layer 10 is applied in 0.5 to 2.0 mm, allowed to be impregnated and penetrate into the reinforcing fibrous substrate, and at the same time it is bonded to the second resin layer 30 to form a laminated body in which the reinforcing fibrous substrate layer 10 and the second resin layer 30 are integrated.

Thereafter, as shown in FIG. 5, while rotating the mandrel 110, a resin material which will form the first resin layer 20 is applied onto the surface of the reinforcing fibrous substrate layer 10 described above, allowed to be impregnated such that a resin precursor layer of thickness of 1.5 to 4 mm will be formed, which is to be the second resin layer 30. Then, the resin precursor layer is heated and cured at 70 to 140° C. for 2 to 20 hours to form a laminated body in which the first resin layer 20, the reinforcing fibrous substrate layer 10, and the second resin layer 30 are laminated.

Besides, the application of the resin material may be done by any method, though, in the present embodiment, this is done by discharging the resin material from the injection molding nozzle 130, while rotating the mandrel 110, and at the same time uniformly applying the provided resin material using a coater bar 120.

Here, at least any one of the resin 13 of the reinforcing fibrous substrate layer 10, the resin 23 of the first resin layer 20, and the resin 33 of the second resin layer 30 comprises a polyurethane resin which comprises as a component the polyether polycarbonate diol X described above. As mentioned above, when the urethane composition (resin material) comprises as a component the polyether polycarbonate diol X described above, the increase in its viscosity can be suppressed. Accordingly, it is possible to form a uniform polyurethane resin layer.

Moreover, heating method is not particularly limited, though, for example, methods using far-infrared heater, etc. may be used.

The obtained laminated body goes through polishing or buff processing as appropriate for the outer circumferential surface 21 and the inner circumferential surface 31, the ends of width direction are cut as appropriate and cleaned up, to provide the shoe press belt 1. The shoe press belt 1 is produced as above.

Moreover, when the shoe press belt 1A is to be produced, for a laminated body formed in the aforementioned resin layer-forming step, the drain grooves 25 may be formed on the outer circumferential surface 21 as follows.

The formation of such drain grooves 25 can be done by any method, though, for example, the drain grooves 25 may be formed by: polishing/buff-processing the outer surface of the laminated body obtained as above to achieve the desired thickness of the shoe press belt 1 (not illustrated), then, while rotating the mandrel 110, bringing a groove working device to which multiple disk-like rotary blades into contact with the outer circumferential surface 21.

The method for producing the shoe press belt in the above-described embodiment has been described as mandrel (one-roll) production method. However, as another embodiment, a two-roll production method as described below can also be employed. First, an annular reinforcing fibrous substrate 11 is hung over two rolls placed in parallel, and to this reinforcing fibrous substrate 11 a resin is applied, impregnated and laminated to form the second resin layer 30 together with the reinforcing fibrous substrate layer 10. Then, this is turned over, and the first resin layer 20 is formed on the surface of the inverted reinforcing fibrous substrate layer 10. This provides the shoe press belt 1. Besides, the order of formation of each resin layer may be optional.

In the description above, cases in which the papermaking device is a shoe press belt has been explained as one example of the present invention, though the present invention is not limited thereto, and it may relate to a method for producing any papermaking device having a resin layer. For instance, the present invention may be a method for producing a papermaking belt such as a wet paper web transfer belt (transfer belt), or it may be a method for producing a papermaking roll such as a press roll.

Even in the cases above, a papermaking belt or papermaking roll can be produced which has a suppressed unevenness in strength between parts and which has a resin layer with excellent strength by forming each resin layer using the above-described polyurethane material comprising the polyether polycarbonate diol X as a component.

As above, the present invention has been described in detail based on preferred embodiments, though the present invention is not limited thereto, and each component can be substituted with any one that is capable of performing an equal function, or an optional component can be added.

EXAMPLES

Hereinbelow, the present invention will more specifically be described with examples, though the present invention is not to be limited to these examples.

1. Production of Shoe Press Belt and Polyurethane Sheet Test Piece

Prior to producing a shoe press belt, first, the polyether polycarbonate diols and polycarbonate diols indicated in Table 1 as polyol compounds, and the resin materials of the compositions of Examples 1 to 3 and Comparative Examples 1 to 4 indicated in Table 2 (urethane composition) obtained using said polyol compounds were prepared. Note that, for all resin materials, the urethane prepolymer and the curing agent were combined such that the combination ratio will be [H]/[NCO]=0.95.

In Table 1, "PEPCD1" and "PEPCD2" indicate polyether polycarbonate diols, "PCD1", "PCD2", "PCD3" and "PCD4" indicate polycarbonate diols, and "PTMG250" indicates polytetramethylene glycol (number average molecular weight 250), respectively.

As for the number average molecular weight of the polyether polycarbonate diol in Table 1, for each polyether polycarbonate diol, its hydroxyl value was measured and the number average molecular weight was calculated based on the obtained hydroxyl value and according to the formula (II) described above. The same applies to the polycarbonate diol in Table 1 and the PTMGs in the aforementioned Table 2.

Furthermore, in Table 2, "MDI" indicates 4,4'-methylenebis(phenylisocyanate), "TDI" indicates a mixture of 2,4-tolylene-diisocyanate and 2,6-tolylene-diisocyanate, "PPDI" indicates p-phenylene-diisocyanate, "BD" indicates 1,4-butanediol, "DMTDA" indicates dimethylthiotoluene diamine, and "PTMG" indicates polytetramethylene glycol (the number average molecular weight: 1039, hydroxyl value: 108.0), respectively.

Next, shoe press belts were prepared according to the following method using the resin materials of Examples 1 to 3 and Comparative Examples 1 to 4.

To a surface of a mandrel having a diameter of 1500 mm and rotatable by any appropriate driving means, a resin material of either of Examples 1, 2 and Comparative Examples 1 to 4 was applied to 1.4 mm thick while rotating the mandrel, using an injection molding nozzle that is capable of running parallel to the rotary shaft of the mandrel. This formed an uncured shoe-side resin layer (second resin layer). Then, the mandrel was left being rotated at a room temperature for 10 minutes, heated to 140° C. by a heating device attached to the mandrel, and pre-cured at 140° C. for 1 hour.

Next, a grid-like web material in which warp yarns are interposed between weft yarns and the intersection of a weft yarn and a warp yarn was joined with urethane-type resin adhesive was placed in one layer on the outer circumferential surface of the shoe-side resin layer such that weft yarns are arranged along the shaft of the mandrel leaving no space. Here, the weft yarns of the grid-like web material are multifilament twist yarns of polyethylene terephthalate fiber of 5000 dtex, whereas the warp yarns are multifilament yarns of polyethylene terephthalate fiber of 550 dtex. The warp yarn density was set to 1 yarn/cm, whereas weft yarn density was set to 4 yarns/cm.

Next, a yarn wound layer was formed by spirally winding multifilament yarns of polyethylene terephthalate fiber of 6700 dtex around the circumference of this grid-like web material with a pitch of 30 yarns/5 cm, and the grid-like web material and yarn wound layer together formed a reinforcing fibrous substrate. Then, the resin material same as that of the shoe-side resin layer (resin materials of Examples 1, 2 and Comparative Examples 1 to 4) was applied so as to close gaps in the reinforcing fibrous substrate, forming a laminated body in which the reinforcing fibrous substrate layer and the shoe-side resin layer are integrated.

Next, over the reinforcing fibrous substrate layer, while rotating the mandrel, the resin material same as those of the reinforcing fibrous substrate layer and shoe-side resin layer (resin materials of Examples 1, 2 and Comparative Examples 1 to 4) was applied to about 2.5 mm thick using an injection molding nozzle that is capable of running parallel to the rotating shaft of the mandrel to form an uncured felt-side resin layer (first resin layer).

Then, this was left at room temperature for 40 minutes while keeping the mandrel being rotated, further heated to 140° C. with heating equipment attached to the mandrel, and each resin layer was thermally cured at 140° C. for 4 hours. This formed a laminated body in which the felt-side resin layer, the reinforcing fibrous substrate layer, and the shoe-side resin layer are integrated.

Subsequently, the felt-contact surface of the felt-side resin layer was polished such that the total thickness would be 5.2 mm to give a laminated body.

After the steps above, shoe press belts according to Examples 1 to 3, Comparative Examples 1 to 4 were obtained. An evaluation of hardness was performed for the obtained shoe press belts. Moreover, in order to evaluate the breaking strength and unevenness in tensile testing, test pieces of 1.0 mm thick polyurethane sheet were cut out from any 20 parts of the felt-side resin layer.

2. Evaluation
2.1 Prepolymer Viscosity

For prepolymers used for resin materials of Examples 1 to 3 and Comparative Examples 1 to 4, viscosity was measured. The viscosity of prepolymers at temperatures 50 and 80° C. were measured using a B-type viscometer (TOKI SANGYO Co., Ltd., Product name: TVB-10H). The rotor used was H3 rotor, and the measurement was performed at revolution speed of 50 rpm for the cases of 200 to 2,000 mPa·s, 5 rpm for the cases of 2,000 to 20,000 mPa·s.

2.2 Evaluation of Hardness

Hardness was measured for the outer circumferential surfaces of the shoe press belts according to Examples 1 to 3 and Comparative Examples 1 to 4. Specifically, the surface hardness of the felt-side resin layers at 22° C. was measured in conformity to JIS K 6301:1995 and using an A-type, spring-type hardness tester.

2.3 Evaluation of Breaking Strength in Tensile Testing

The breaking strength was measured using a universal tensile testing machine as the testing machine and a test piece of dumbbell-No. 3-shape defined in JIS K 6251 for the sample shape, at tension rate of 500 mm/min, and evaluated as stress (MPa) at the time of breaking of the test piece. Twenty measurements were made for each Example/Comparative Example, and the average value was presented.

2.4 Evaluation of Unevenness in Breaking Strength

The unevenness in the breaking strength was evaluated by calculated standard deviations for 20 measurements of the breaking strength in the tensile testing.

Table 2 shows the results of the above evaluations along with the compositions of the resin materials of Examples 1 to 3 and Comparative Examples 1 to 4, etc.

TABLE 1

| Type of Polyol compound | Diol Constituents | | Diol 1/ Diol 2 (mol)/ (mol) | Number Average Molecular Weight | Hydroxyl Value (mg KOH/g) |
| --- | --- | --- | --- | --- | --- |
| | Diol 1 | Diol 2 | | | |
| PEPCD1 | PTMG250 | — | 100/0 | 958 | 117.2 |
| PEPCD2 | PTMG250 | — | 100/0 | 1938 | 57.9 |
| PCD1 | 1,6-hexanediol | — | 100/0 | 1002 | 112 |
| PCD2 | 1,6-hexanediol | — | 100/0 | 2074 | 54.1 |
| PCD3 | 1,6-hexanediol | 1,5-pentanediol | 50/50 | 1983 | 56.6 |
| PCD4 | 1,6-hexanediol | 1,5-pentanediol | 50/50 | 1009 | 111.2 |

TABLE 2

| | | | Example 1 | Example 2 | Example 3 | Comparative Example 1 | Comparative Example 2 | Comparative Example 3 | Comparative Example 4 |
| --- | --- | --- | --- | --- | --- | --- | --- | --- | --- |
| Resin material | Prepolymer | Type of isocyanate compound | MDI | TDI | MDI | MDI | PPDI | TDI | MDI |
| | | Type of compound polyol | PEPCD1 | PEPCD1 50% PEPCD2 50% | PEPCD2 | PCD1 | PCD2 | PTMG | PCD3 45.6% PCD4 54.4% |
| | | Proportion of PEPCD in polyol compound (mass %) | 100 | 100 | 100 | 0 | 0 | 0 | 0 |
| | | NCO % | 9.99 | 6.01 | 5.0 | 9.06 | 3.51 | 6.06 | 8.83 |
| | Curing agent | Type | BD | DMTDA | DMDTA | BD | BD | DMTDA | BD |
| | Proportion of PEPCD in polyurethane (mass %) | | 50.8% | 67.3% | 67.3% | 0 | 0 | 0 | 0 |
| Evaluation | Prepolymer viscosity (mPa · s) | @50° C. | 3,220 | 7,500 | 1,4000 | solid | solid | 1,900 | 28,000 |
| | | @80° C. | 720 | 1,470 | 3,600 | 5,000 | 6,000 | 440 | 5,000 |
| | Hardness (HS JIS A) | | 95 | 95 | 91 | 95 | 95 | 95 | 95 |
| | Tensile testing (MPa) breaking strength | Mean Value | 46.2 | 56.1 | 60.8 | 35.1 | 36.9 | 30.8 | 42.8 |
| | | SD | 1.3 | 1.8 | 2.6 | 3.6 | 5.7 | 1.1 | 3.2 |

As shown in Table 2, the shoe press belts according to Examples 1 to 3 had a suppressed unevenness in strength among their parts and further were better in strength. In comparison, the shoe press belts according to Comparative Examples 1 to 4 either had a greater unevenness in strength among their parts or was inferior in strength. In particular, in Comparative Examples 1, 2 and 4 in which polycarbonate diol were used as polyol compounds, there was a large unevenness in strength among parts. Because of this, the shoe press belt according to Comparative Examples 1, 2 and 4 are likely to be broken starting from a part having a weak strength, failed to increase the durability of the shoe press belt. Moreover, in Comparative Examples 3, as a result of using polytetramethylene glycol as a polyol, the unevenness in strength among parts could be suppressed, though the shoe press belt had an inferior strength.

What is claimed is:

1. A papermaking device for use in papermaking machine, comprising at least one resin layer comprising a polyurethane resin, wherein:
the polyurethane resin comprises as a component of the polyurethane resin a polyether polycarbonate diol consisting essentially of one or more unit(s) A expressed by the following formula (1):

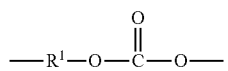

(1)

in the formula (1):
R¹ is a bivalent group derived from a polyether polyol having the number average molecular weight equal to or higher than 200 and equal to or less than 3,000.

2. The papermaking device according to claim 1, wherein:
R¹ is a group expressed by the formula (2) below:

(2)

in the formula (2):
R² is, for each occurrence, independently identical or different, and is a straight-chain, branched or cyclic alkylene group having 1 or more and 20 or less carbon atom(s), and
n is an integer equal to or more than 2 and equal to or less than 42.

3. The papermaking device according to claim 2, wherein R² is selected from the group consisting of an ethylene group, n-propylene group, n-butylene group, n-pentylene group and n-hexylene group.

4. The papermaking device according to claim 1, wherein the polyurethane resin is obtained by reacting a urethane prepolymer having an isocyanate group comprising as (a) component(s) one or more of the polyether polycarbonate diol(s) with a curing agent having an active hydrogen group.

5. The papermaking device according to claim 4, wherein the urethane prepolymer is obtained by reacting (a) polyisocyanate compound(s) comprising one or more selected from the group consisting of p-phenylene-diisocyanate, 4,4'-methylenebis(phenylisocyanate), dimethylbiphenylene diisocyanate, 2,4-tolylene-diisocyanate, 2,6-tolylene-diisocyanate and 1,4-bis(isocyanatemethyl)cyclohexane with (a) polyol compound(s) comprising one or more of the polyether polycarbonate diol(s).

6. The papermaking device according to claim 4, wherein the NCO content of the urethane prepolymer is equal to or higher than 3.0% and equal to or less than 15%.

7. The papermaking device according to claim 4, wherein the curing agent comprises one or more selected from the group consisting of 4,4'-methylene-bis-(2-chloroaniline), dimethylthiotoluene diamine, diethyltoluene diamine, 4,4'-methylene-bis-(3-chloro-2,6-diethylaniline), hydroquinonebis-β-hydroxyethyl ether and 1,4-butanediol.

8. The papermaking device according to claim 4, wherein the curing agent comprises one or more of the polyether polycarbonate diol(s).

9. The papermaking device according to claim 1, wherein the polyurethane resin is obtained by reacting a urethane prepolymer having an isocyanate group with a curing agent having an active hydrogen group comprising one or more of the polyether polycarbonate diol(s).

10. The papermaking device according to claim 1, wherein the hardness of the resin layer measured at 22° C. in conformity to JIS K 6301:1995 is equal to or higher than 90 HS JISA and equal to or less than 98 HS JISA.

11. The papermaking device according to claim 1, wherein the papermaking device is a shoe press belt.

12. The papermaking device according to claim 11, comprising a first layer which constitutes the outer circumferential surface of the shoe press belt and is the resin layer, wherein:
the first layer comprises the polyurethane resin.

13. The papermaking device according to claim 11, comprising a second layer which constitutes the inner circumferential surface of the shoe press belt and is the resin layer, wherein:
the second layer comprises the polyurethane resin.

14. A method for producing a papermaking device for use in a papermaking machine,
comprising a step of forming a resin layer comprising a polyurethane resin by curing a polyurethane material, wherein:
the polyurethane material comprises as a component of the polyurethane resin a polyether polycarbonate diol consisting essentially of one or more unit(s) A expressed by the following formula (1):

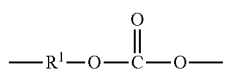

(1)

in the formula (1):
R¹ is a bivalent group derived from a polyether polyol having the number average molecular weight equal to or higher than 200 and equal to or less than 3,000.

15. The papermaking device according to claim 1, wherein the polyether polycarbonate diol is expressed by a following formula (3):

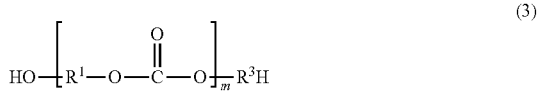

(3)

in the formula (3), R1 and R3 are each independently a bivalent group derived from a polyether polyol having the number average molecular weight equal to or higher than 200 and equal to or less than 3,000, and m is an integer equal to or more than 1 and equal to or less than 34.

16. The method according to claim 15, wherein the polyether polycarbonate diol is expressed by a following formula (3):

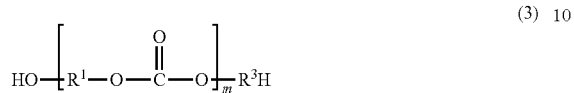

(3)

in the formula (3), R1 and R3 are each independently a bivalent group derived from a polyether polyol having the number average molecular weight equal to or higher than 200 and equal to or less than 3,000, and m is an integer equal to or more than 1 and equal to or less than 34.

17. The papermaking device according to claim 1, wherein the polyurethane resin is substantially free of a polycarbonate diol.

18. The method according to claim 14, wherein the polyurethane resin is substantially free of a polycarbonate diol.

* * * * *